United States Patent [19]

Hak Soo

[11] Patent Number: 5,734,111
[45] Date of Patent: Mar. 31, 1998

[54] APPARATUS FOR MEASURING THE FLOW QUANTITY OF RIVERS AND METHOD THEREOF

[75] Inventor: Chang Hak Soo, Seoul, Rep. of Korea

[73] Assignee: Changmin Co., Ltd., Seoul, Rep. of Korea

[21] Appl. No.: 761,425

[22] Filed: Dec. 6, 1996

[30] Foreign Application Priority Data

Dec. 28, 1995 [JP] Japan .................................. 7-342768

[51] Int. Cl.⁶ .............................. G01F 13/00; G01F 1/00
[52] U.S. Cl. .................................. 73/861.25; 73/861.27; 73/170.13
[58] Field of Search ........................... 73/861.25, 861.27, 73/861.26, 861.28, 861.18, 170.13, 170.33, 170.34

[56] References Cited

U.S. PATENT DOCUMENTS 5,515,721   5/1996   Kim et al. ........................... 73/170.13
5,531,125   7/1996   Ahn et al. ........................... 73/861.27

*Primary Examiner*—George M. Dombroske
*Assistant Examiner*—Harshad Patel
*Attorney, Agent, or Firm*—Laurence R. Brown

[57] ABSTRACT

A first measurement unit for untrasonically measuring a flow velocity, a river depth, and an ultrasonic velocity is mounted on floating members. The floating members are connected with a travelling unit for automatically travelling a propeller flowmeter which is used in advance, to thereby measure vertical average flow velocities and river depths at a plurality of positions while moving along a river width. The floating members are provided with ultrasonic vibrators in the center thereof for measuring a river depth and an ultrasonic velocity as well as with ultrasortie vibrator pairs for measuring flow velocities. A second measurement unit for measuring an ultrasonic pulse propagation time period has a unit for calculating an ultrasonic velocity, a river depth, a partial flow quantity and an entire flow quantity, and a unit for controlling movements of the floating members and a distance between the ultrasonic vibrators. The second measurement unit is mounted in a flow quantity measurement post, connected to the first measurement unit and a high frequency cable line and supplies electric power to the first measurement unit.

10 Claims, 7 Drawing Sheets

FIG.5
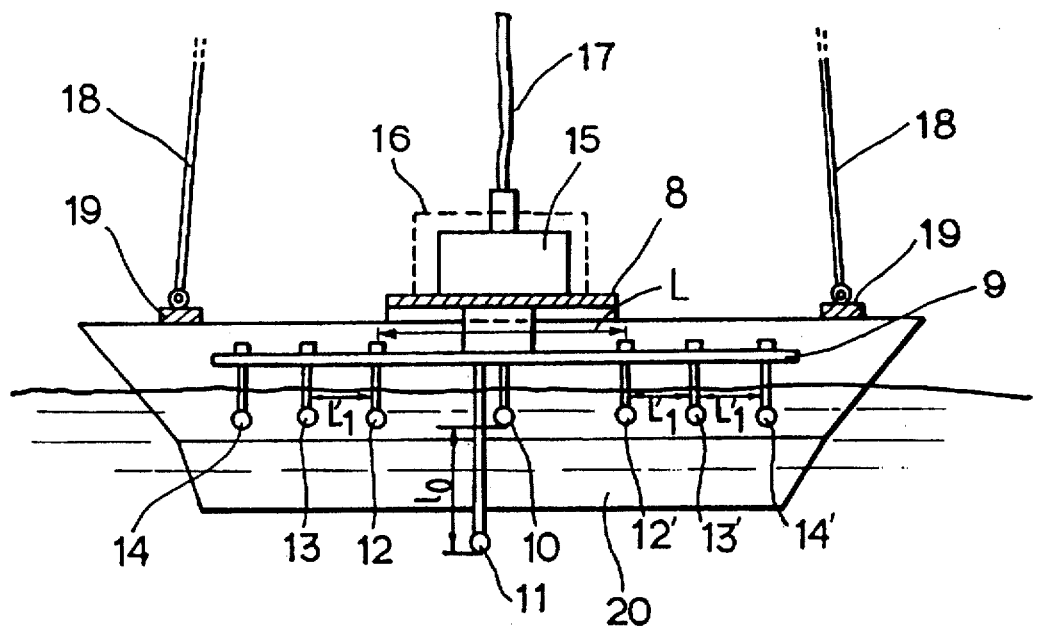
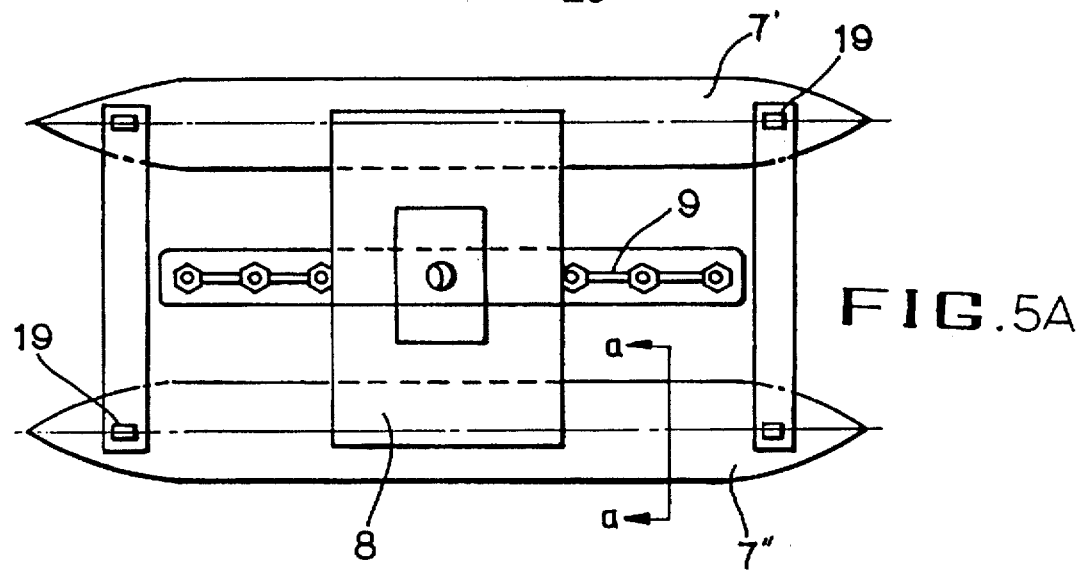
FIG.5A
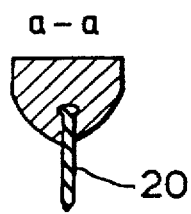
FIG.5B

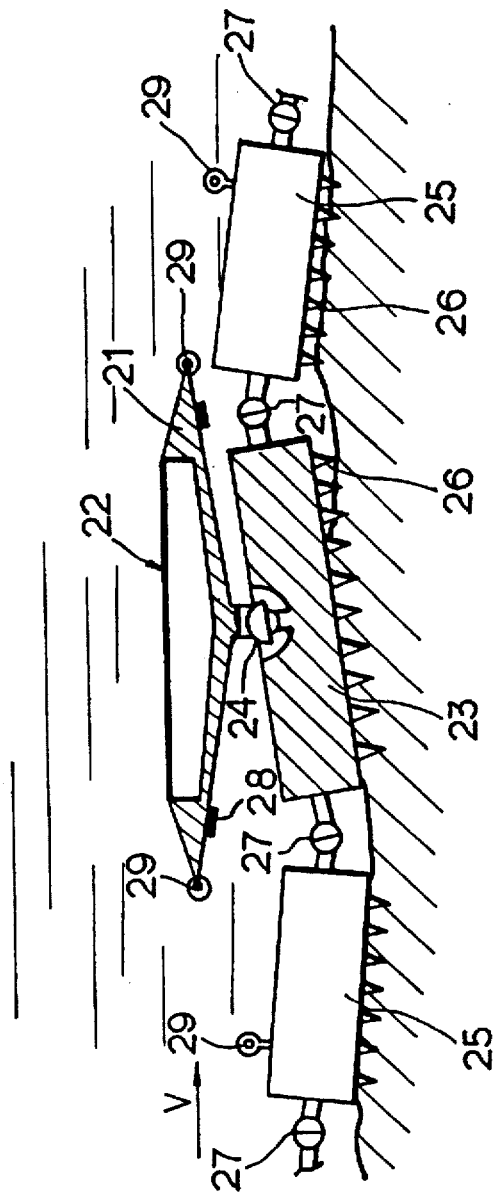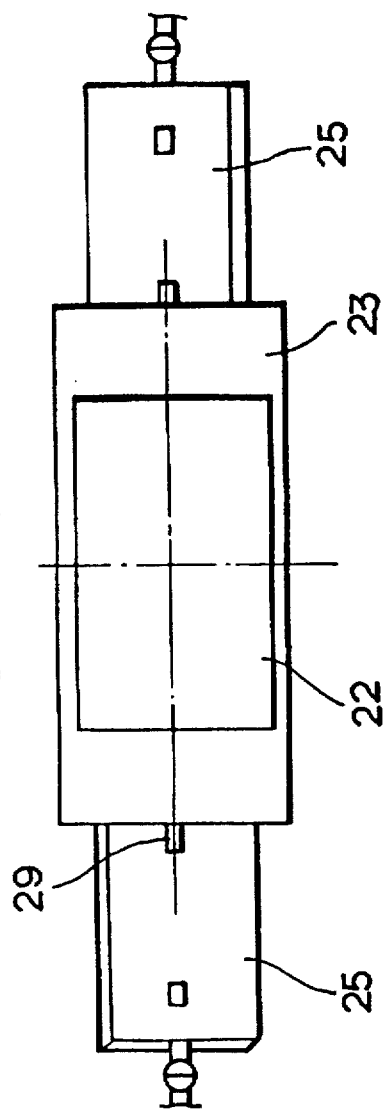

APPARATUS FOR MEASURING THE FLOW QUANTITY OF RIVERS AND METHOD THEREOF

BACKGROUND OF THE INVENTION

1. Field of the Invention

The present invention realtes to an apparatus and a method for measuring the quantity of flow, more particularly to an apparatus for measuring a local flow quantity of a river through ultrasonical measurements of river depths, a vertical average flow velocity and a method therefor.

2. Prior Art

Generally, a permanent river flow quantity measurement post obtains or renews a river depth versus a flow quantity curve which measures the general flow quantity of a river or a river flow quantity at a position in a river by a propeller flowmeter, which is automatically moved on a river. The river flow quantity measurement post carries out various flow quantity measuring performances which may be dependent upon methods under consideration. In order to periodically and accurately measure a flow quantity at a position having an unstable river level-flow quantity relation and at a position having a flow quantity varying in a large range, a flow velocity is directly measured at a position through a propeller (or a cup-type) flow meter to thereby measure a flow quantity by calculating the flow velocity times an area. That is, several vertical lines are set on a cross section S of a river. In order to measure the average flow velocity on each of the vertical lines, river flow velocities at various positions on each one of the vertical lines are measured by a propeller flowmeter. If there are six vertical lines considered and five positions selected on each one of the six vertical lines, thirty river flow velocities should be measured in that six multiplied by five makes thirty.

When a river flow velocity is measured at one position for one minute at minimum (however, a two or three-minute time period is usually needed), it takes 30 minutes to measure only the river flow velocity. When taking into consideration the time periods needed for moving the flow-meter from the first position to the thirtieth position and for measuring river depths along each of the vertical lines and intervals between the vertical lines, it is likely to take more than one hour to measure the flow velocity even though the time needed is actually dependent upon the width and depth of the river.

Further, two or more time measurements of a flow quantity on a daily basis requires a lot of manpower. For convenience in such a flow quantity measurement, there are many automated flow quantity measurement posts established which automatically move and insert the propeller flowmeter.

FIG. 1 is a schematic view for explaining the principle of a typical apparatus for automatically measuring a flow quantity. A steel rope 1 is set up over the surface of a river. A propeller flowmeter 2 moves to the left and right directions along a steel rope 1. Further, a winch 4 connected with a plumb 3 is prepared for moving propeller flowmeter 2 up and down. Winch 4 travels by a rope-driving control unit mounted in a flow measurement post 5. The rope-driving control unit is operated by control of a program. A river level gauge 6 is mounted for measuring river levels. Dotted lines I, II, III, IV, and V of FIG. 1 denote vertical lines considered for measuring vertical average flow velocities, and reference numeral X denotes the position for a propeller flowmeter 2 to measure a river flow velocity. River depths on the vertical lines or between the vertical lines are calculated by the results measured through river level gauge 6. (The river has been surveyed in advance for a river cross section drawing). There are some formulae for calculating a flow quantity, but the basic principle for the formulae is the same. A vertical average flow velocity $V_{Li}$ is calculated by using river flow velocities measured at various positions along vertical lines, and a partial cross section area is calculated by ming river depth measurement data trader the asstunption that a partial flow cross seaion area $S_i$ in a region where the vertical average flow velocity is measured forms a diamond shape. The vertical average flow velocity times the partial cross section area ($V_{Li} \times Si$) s called a partial flow quantity. The total flow quantity is calculated by the sum of the partial flow quantities. By ming a flow measurement unit which automatically moves and is submerged in a river flowmeter so as to be fixed at a river flow velocity measurement position (a coordinate), the processes of a river flow quantity measurement become more facilitated compared to manual processes. However, basic drawbacks still remain.

As mentioned above, the first major drawback is that the time period for a river flow velocity measurement at every position is hardly shortened, and that the total time period for river flow velocity measurements is much greater than that of moving a flow meter. The second major drawback is that the flow quantity measurement margin of error is larger. In order to perform a relatively accurate measurement of a flow quantity, the number of vertical lines for a vertical average flow velocity measurement should become greater, and river flow velocities at five positions at minimum on each of the vertical lines should be measured.

Therefore, the time period for a measurement is likely to become very long. If a river level and a flow quantity are in a relatively quick variation, that is, if a flow quantity increases or decreases by 10% or 20% at the time total processes for a river flow velocity measurement are completed, the flow quantity measurement error increases by that much. In particular, in case that a lack phenomenon occurs, the result of a flow quantity measurement is hardly corrected since the river level variation is not proportional to the flow quantity variation. The vertical average flow quantity measurement error which has a lot of inffluence on the flow measttrement error is also relatively large. It is characteristics of a river flow velocity that the flow velocity variation rate is large, diverse variation frequencies appear and a flow velocity distribution on each of the vertical lines according to the shape of a river bottom are different from the curve which is drawn by a logarithmic function or an exponential function.

Therefore, the vertical average flow velocity error may become large when the vertical average flow velocity is calculated by substituting river flow velocities measured at three or five positions into a simple formula. Further, a cross section area calculation error may become larger since a partial area is obtained through a calculation of a river depth corresponding to the vertical line on which the flow velocity is measured, or through a calculation of a river depth between the vertical lines by measuring only the river level and once surveying a cross section of a river intended for a flow quantity measurement. The cross section of a river may be chataged at any time. However, the flow quantity measurement unit which automatically moves a flowmeter hardly measures the river depth when measuring the flow quantity. Therefore, the partial area measurement error may increase. When adding up the errors mentioned above, the margin of error of a flow quantity measurement may greatly increase.

FIG. 2 is a schematic view for explaining the basic principle of an ultrasonic flow quantity measurement unit for a river. The ultrasonic flow quantity measurement unit may partially solve the drawbacks of the automatic flow quantity measure unit. Reference numerals $A_1B_1$, $A_2B_2$, $A_3B_3$, and $A_4B_4$ in FIG. 2 denote ultrasonic vibrator pairs which integrally have an ultrasonic pulse transmitter and an ultrasonic pulse receiver. A vibrator pair is mounted on opposite sides of a river, forming a certain angle with respect to the center line of the flow. The vibrator pair transmits an ultrasonic pulse from $A_i$ to $B_i$ or vice versa and directly measures a received time, that is, a propagation time period of the ultrasonic pulse, thereby measuring a horizontal average flow velocity by a time difference or a frequency difference. For example, UF-210000 flow quantity measurement unit of Ultraflux company and an ultrasonic flow quantity measurement post are a vibrator pair, respectively.

After the horizontal average flow velocity has been measured, the distance between vibrator pairs placed on an upper position and a lower position is multiplied by the distance of their center line(that is, a river cross section area) to thereby calculate the partial area $S_i$. The partial area $S_i$ is multiplied by the horizontal average flow velocity $V_i$ to obtain the flow quantity. That is, the formula for obtaining the flow quantity Q is as follows:

$$Q = \Sigma S_i \bar{V}_i$$

The use of the ultrasonic river flow quantity measurement unit has advantages in that it takes ten times less time to measure a horizontal average flow velocity than the time period required when the propeller flowmeter is used and a flow velocity measurement margin of error decreases. However, the ultrasonic river flow quantity measurement unit has a big drawback in that the flow quantity measurement error increases when the river depth decreases in the condition that a river level varies in a wide range.

The number of ultrasonic vibrator pairs(the line number) is four as shown in FIG. 2. Two of the four ultrasonic vibrator pairs ($A_3B_3$, $A_4B_4$) are operated when a river depth is half of the maximum river depth. The other two are not used to measure the horizontal average flow velocity. Therefore, the number of the ultrasonic vibrator pairs should be greatly increased for an accurate flow quantity measurement regardless of the river level variation.

For instance, a horizontal average flow velocity measurement unit of multi lines such as 10 lines, 20 lines, etc. should be established. Therefore, the flow quantity measurement system becomes more complicated. Especially, the amount of work increases and is more complex because of extensive installation work, the measurement of the distance between vibrator pairs, and the measurement of the angle of the vibrator pairs with respect to the flow axis should be performed.

Although a traveling unit can be considered, in order to reduce the number of lines, for moving all the established ultrasonic vibrator pairs into a river according to the river depth variation, the traveling unit itself becomes complicated, and the units for precisely catching coordinates of the vibrator pairs, distances and angles therebetween become complicated. Another drawback of the ultrasonic vibrator pairs is the need of using expensive vibrator pairs and cable in order to prevent their breakdown since they are placed in a river. Considering these drawbacks, in the case that a flow quantity post having a system for automatically moving a flowmeter has been put in place and the river is not so wide, replacing a propeller flowmeter with an ultrasonic vertical average flowmeter and using the automatic flowmeter-moving system are much more economical than using the ultrasonic multi-line flowmeter for measuring the horizontal average flow velocity and greatly decreases the margin of flow measurement error.

It is reasonable to use an ultrasonic flowmeter for measuring the horizontal flow velocity when a river is a few hundred meters wide. When considering these aspects, as a method for ultrasonically measuring a vertical average flow velocity, a method for reflecting an ultrasonic pulse from the opposite wall, which is used in a flowmeter for a pipe, can be utilized. FIG. 3 is a schematic view for explaining a principle of measuring a flow velocity by reflecting an ultrasonic pulse from a pipe wall. (For example, a method used in an ultrasonic flowmeter for a pipe which is 990DB type of Controltron company in the U.S.A.)

As shown in FIG. 3, since the internal diameter D of a pipe does not change, the optimum incidence and reflection angles θ can be maintained all the time, and an ultrasonic pulse propagation locus and an angle ψ with respect to the direction of a flow velocity V can be kept invariable. Therefore, it is convenient to measure a flow velocity. The ultrasonic pulse injection method can be used for measuring a river's vertical average flow velocity.

FIG. 4 is a schematic view for explaining a principle of measuring a river's vertical average flow velocity by using an ultrasonic pulse. Reference numeral H denotes the river depth. The river depth H, which is treated differently from the diameter of a pipe in here, is a variable. Ultrasonic vibrators A and B are established at a distance L therebetween in a flow direction. The distalace L is selected to maintain an incidence angle $θ_1$ which an ultrasonic pulse can be best reflected at a position on the bottom of a river. Since the bottom of a river is not an ideal plane as well as the surface of the bottom which reflects an ultrasonic pulse is not parallel with the river surface. Therefore, a vertical line drawn down at a L/2 point does not correspond to a reflecting point in many occasions. Accordingly, when an ultrasonic pulse is propagated in a route of A—a—B or B—a—A, symmetry is not formed as shown in FIG. 4. However, an asymmetrical transmission-reception locus is allowed when a time difference method is used. A propagation time period $t_1$ along the route of A—a—B is calculated as follows:

$$t_1 = \frac{l_1}{C+v_1} + \frac{l_2}{C-v_2} \tag{1}$$

And a propagation time period $t_2$ along the route of B—a—A is calculated as follows:

$$t_2 = \frac{l_2}{C+v_2} + \frac{l_1}{C-v_1} \tag{2}$$

wherein, $$v_1 = \bar{V} \cos \psi_1, \bar{V} \cos \psi_2$$

Therefore, $\Delta t = t_2 - t_1$ can be calculated as follows:

$$\Delta t = \left( \frac{l_1}{C-v_1} - \frac{l_1}{C+v_1} \right) + \left( \frac{l_2}{C-v_2} - \frac{l_2}{C+v_2} \right) = \frac{2\bar{V}(l_1 \cos\psi_1 + l_2 \cos\psi_2)}{C^2} = \frac{2\bar{V}L}{C^2} \tag{3}$$

Therefore, $$\overline{V} = \frac{\Delta t C^2}{2L} \quad (4)$$

wherein, C=an ultrasonic velocity, L=the distance between ultrasonic vibrators A and B. Therefore, it is not necessary to know the transmission angle $\psi_1$ and the reception angle $\psi_2$. The distance L can be precisely measured in advance. Only the measurement of an ultrasonic velocity C remains as a problem to be resolved. In order to use the frequency difference method which does not include the ultrasonic velocity C, it is necessary to meet the requirements of $l_1=l_2=l$ and $\psi_1=\psi_2=\psi$. At this time, the frequency difference $\Delta f$ is obtained as follows:

$$\Delta f = \frac{1}{t_1} - \frac{1}{t_2} = \frac{\overline{V}\cos\psi}{l} \; ; \; \overline{V} = \frac{\Delta f l}{\cos\psi} \quad (5)$$

If the river depth H is precisely known, the equation (5) can be described as follows:

$$l = \frac{H}{\sin\psi} \; ; \; \psi = \arctan\left(\frac{2H}{L}\right)$$

Therefore, $$\overline{V} = \frac{2\Delta f H}{\sin\left(2\arctan\frac{2H}{L}\right)} \quad (6)$$

When using the frequency difference method, the river depth H must be accurately measured, and the ultrasonic pulse reflection surface must be parallel all the time with the plane on which the ultrasonic vibrators A and B are placed. However, the bottom of a river is usually not parallel with the river surface as well as diversely flexural. Further, even though a special reflection plane is established on the bottom of a river, since the river surface can not become a plane by waves, the reflection plane surface is hardly maintained in a perfect parallelism with the bottom of a river by any unit to which the ultrasortie vibrators A and B are fixed.

Therefore, it is reasonable to use the frequency difference method. If the time difference method is used, the ultrasonic velocity C must be exactly measured as described in formula (4). Generally, the ultrasonic velocity C is calculated as follows:

$$C^2 = \frac{4l^2}{t_1 \cdot t_2} \; , \; !\text{\$otherwise!\$} C = \frac{4l}{t_1+t_2} = \frac{2(l_1+l_2)}{t_1+t_2} \quad (7)$$

$t_1$ and $t_2$ are variables which must be directly measured. It is difficult to directly measure l1 and l2 when $l=l_1=l_2$. Only when the distance L between the ultrasonic vibrators is exactly known, $l=l_1=l_2$ can it be calculated by using a trigonometrical function. In case of $l_1 \neq l_2$, it is impossible to measure $l_1$ and $l_2$. Accordingly, the formula (7), which is widely used, can not be applied.

Another problem to be solved relates to the guarantee of an optimum incidence angle $\theta_1$. If the distance L is fixed as shown in FIG. 4 under the condition that a river level varies in a wide range and the river depth H is changed to another river depth H, the incidence angle $\theta_1$ is increased and no reflection occurs depending upon the substance property of the reflecting surface.

Even though a river level remains unchanged while measuring the flow quantity, a river depth varies, as shown in FIGS. 1 and 2, in every region where the vertical average flow velocity is measured. Therefore, according to the variation of the river level as well as to a region where the vertical average flow velocity is measured, the distance L between the ultrasonic vibrators A and B should be a variable so as to secure an optimal incidence angle $\theta_{lopt}$. Even though the optimal incidence angle $\theta_{lopt}$ varies according to the soil constituting the bottom of a river, the optimal incidence angle $\theta_{lopt}$ is in the range from 20° to 40°. However, since the measurement sensitivity of a flow velocity gets worse as the incidence or reflection angle becomes smaller, it is better to measure the incidence angle as large as possible. Even though an incidence angle is set for the best reflection, not a few occasions occur in which the reception is not made according to the soil of the bottom of a river. Despite the selection of an ultrasonic frequency as low as possible(like an echo sounder), it is hardly secured to safely receive a reflecting pulse.

Next, the river depth H should be exactly measured in a region where the vertical average flow velocity is measured. The partial flow $q_i$ is generally calculated as follows:

$$q_i = \frac{\overline{V}_{i-1} + \overline{V}_{i+1}}{2} \cdot \frac{h_{i-1} + h_{i+1}}{2} \cdot b_1. \quad (8)$$

Therefore, the quantity $Q=\Sigma q_i$. Further, the measuremere error of the partial flow $q_i$ is the sum of the measurement error of the vertical average flow velocity $V_i$ and the measurement error of the river depth $h_{ij}$.

As the distance bi between vertical lines becomes smaller, the measurement error $q_i$ gets smaller and the measurement error of the quantity Q gets smaller(the number of vertical lines is increased). The measurement of the river depth H is not simply done by ming the ultrasonic pulse. The river depth H can be calculated under the condition that $l_1$, $l_2$, $\psi_1$, $\psi_2$ and an ultrasonic velocity C are exactly known.

SUMMARY OF THE INVENTION

In order to solve the above problems, the first object of the present invention is to provide an apparatus for ultrasonically measuring vertical average flow velocity and a method therefor, wherein an ultrasonic velocity measures a river depth by using a time period difference method at the time when receiving an ultrasonic pulse reflected from a river bed to a river surface with the ultrasonic pulse being transmitted from the river surface to the river bed.

It is a second object of the present invention to provide an apparatus for securing an optimal incidence angle according to the variation of a river's depth.

It is a third object of the present invention to provide an apparatus for completely reflecting an ultrasonic pulse from a river bed without regard to the king of soil of the river bed.

A first measurement unit according to the present invention is mounted on a catamaran-type floating member and used to ultrasonically measure flow velocity and a river depth. The floating member is connected to a unit for automatically navigating a propeller flowmeter which has already been used, moving along a width of a river to thereby measure vertical average flow velocities and river depths at several locations. An ultrasonic vibrator for measuring a river's depth and an ultrasonic velocity is mounted on the center of the floating member. Further, the floating member has an ultrasonic vibrator pair for measuring flow velocity.

A second measurement unit measures an ultrasonic pulse propagation time period, and includes a first part for calculating an ultrasonic velocity, a river depth, a partial flow quantity and a total flow quantity, and a second part for controlling the distance between the ultrasonic vibrator pair and the movement of the floating member and so on. The second measurement unit is mounted in a flow quantity measurement post, connected with the first measurement unit through a high frequency cable line. Further, the second measurement unit supplies electric power to the first measurement unit.

In the flow quantity measurement post, reflecting plates are mounted on river beds corresponding to the regions where vertical average flow velocities are measured, to thereby reflect all the ultrasonic pulses from the river beds. Each of the reflecting plates, which is mounted very conveniently, has a structure to be maintained in parallel with a river bed regardless of the state of the surface of the liver bed.

BRIEF DESCRIPTION OF THE DRAWINGS

FIGS. 5, 5A and 5B are respectively side, top and end views showing an apparatus according to the embodiment of the present invention for measuring vertical average flow velocity and the depth of a river;

FIGS. 8 and 8A are respectively a side view, partly in section, and a top view showing the structure of an ultrasonic pulse reflecting unit mounted on a river's bed;

DETAILED DESCRIPTION OF THE INVENTION

An embodiment of the present invention will be described in detail below with reference to the accompanying drawings.

In FIGS. 5, 5A and 5B one of the first measuring units according to an embodiment of the present invention is shown. A pair of floating members 7' and 7" constitutes a catamaran which floats in the river, and there is a deck 8 connecting the pair of floating members 7' and 7" to each other. The deck 8 is connected to a support member 9 for arranging and fixing ultrasonic vibrators 10 and 11 thereto. The ultrasonic vibrators 10 and 11 are vertically fixed at a distance lo on the center of the support member 9, Pairs of the ultrasonic vibrators 12 and 12', 13 and 13', and 14 and 14' are disposed at the left and right side of the center (the number of the pair of ultrasonic vibrators is three in FIG. 5, but can be higher in number). A distance L between the ultrasonic vibrators in one pair is selected by the minimum and maximum river levels and a cross section of a river, which will be in detail described later.

Figure 1:
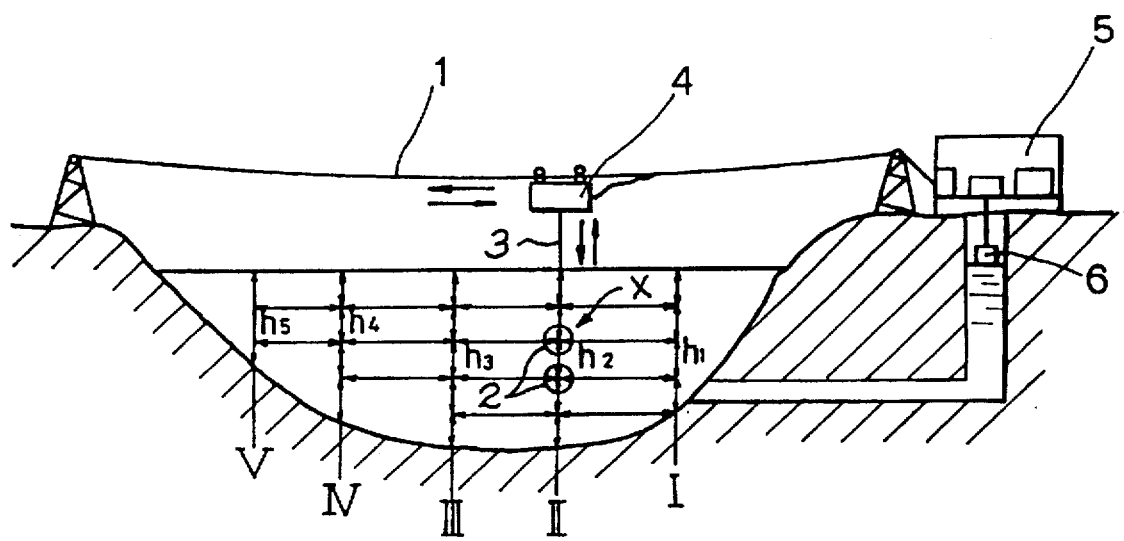
FIG. 1 is a schematic view showing a flow quantity measurement post for measuring river flow velocities at several appoimed positions by using a conventional mechanical flowmeter(in other words, pripeller flowmeter)
Figure 2:
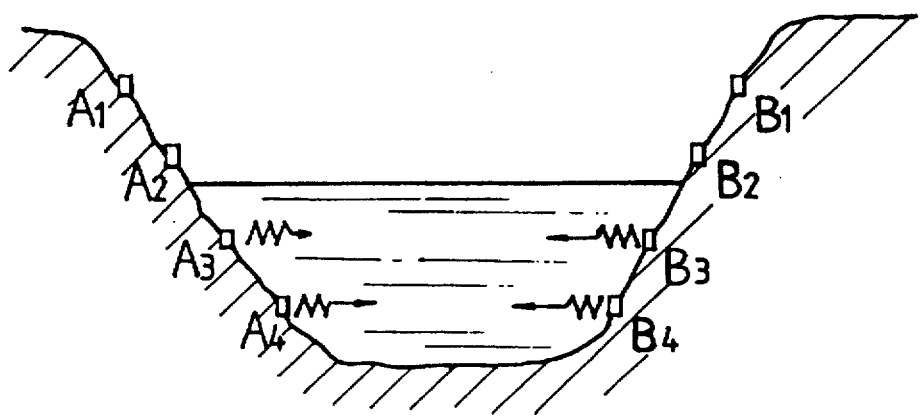
FIG. 2 is a schematic view explaining a known principle of measuring a river flow quantity by ultrasonically measuring the horizontal average flow velocity.
Figure 3:
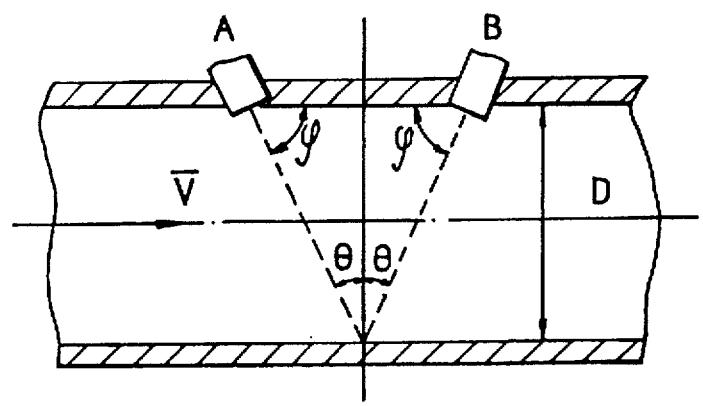
FIG. 3 is a view explaining a known principle of ultrasonically measuring flow velocity by using a reflection-type ultrasonic flowmeter for a pipe.
Figure 4:
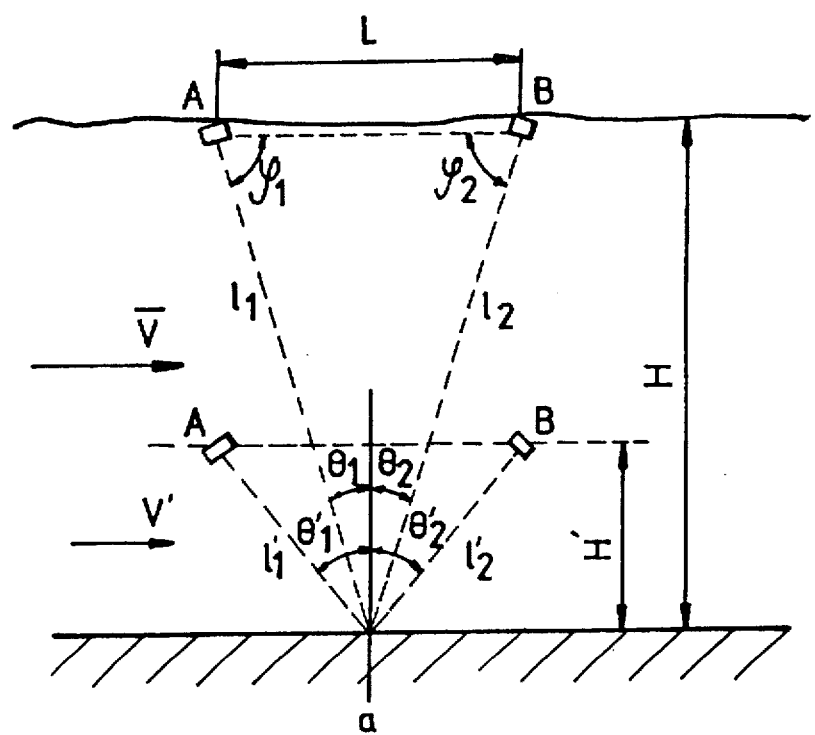
FIG. 4 is a view explaining the measurement of a vertical average flow velocity of a river by using a reflection-type ultrasonic flow velocity measurement method.

A transceiver 15 having an ultrasonic pulse generator, a reception amplitude and reception pulse signal former, and an exchanger for connecting a signal generator and a signal receiver by selecting the ultrasonic vibrators is mounted on the deck 8. A case 16 is also provided for protecting the transceiver 15. There is a cable line 17 connecting the second measurement unit mounted in the flow quantity measurement post with the transceiver 15, to thereby control the transceiver 15 and supply a signal therefrom. The floating members 7' and 7" are connected with a traveling car 4 (refer to FIG. 1) through a rope 18 connected with a connecting ring 19. The catamaran is provided with a stabilization iron plate 20 on the lower portion thereof in order for the catamaran to stably float in the river while sinking under to a certain depth.

Figure 6:
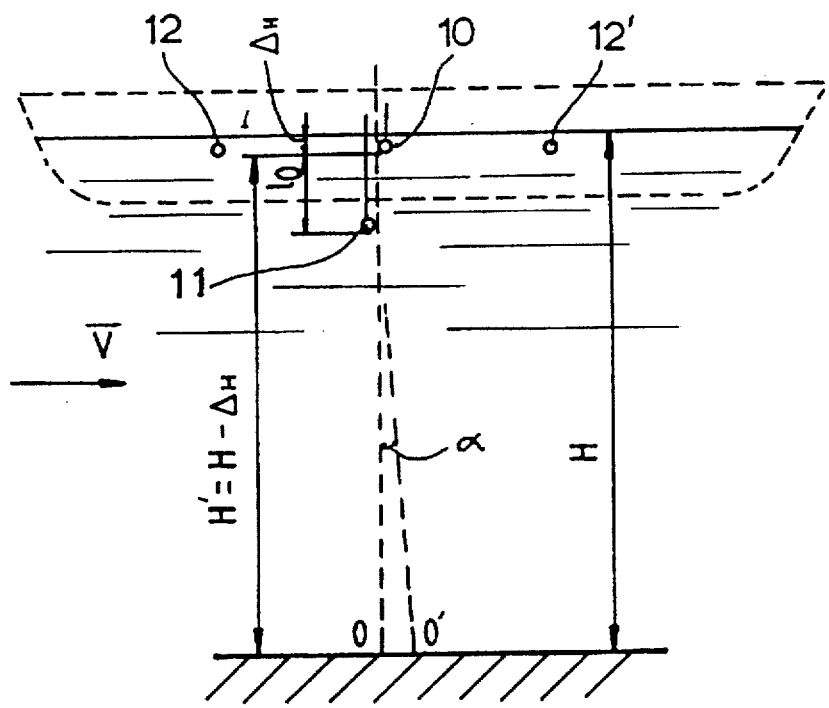
FIG. 6 is a view explaining the principle of measuring a river's depth and an ultrasonic velocity according to an embodiment of the present invention.

At first, in order to measure a river flow quantity by using the flow quantity measurement apparatus having a structure mentioned above, the river depth H and an ultrasortie velocity C are measured just before. obtaining the vertical average flow velocity. FIG. 6 is a view explaining a principle of measuring a river depth and an ultrasonic velocity according to an embodiment of the present invention. The ultrasonic vibrators 10 and 11 are activated. The distance L thereben, een is already exactly known, and a certain depth $\Delta H$ for the vibrator 10 to be submerged from a river surface is known. A river depth to be directly measured is $H'=H-\Delta H$. That is, if the river in FIG. 6 is a view explaining a principle of measuring a river's depth and an ultrasonic velocity according to an embodiment of the present inw, ntion by which depth H' is measured, and the river depth H is calculated by adding the river depth $\Delta H$ to the river depth H'. The river depth H' is measured as follows. That is, the ultrasonic vibrator 10 vertically transmits an ultrasonic pulse toward a river bed. At this time, the ultrasonic pulse may be reflected from a reflecting point $\bigcirc$ on the vertical line, or from another reflecting point $\bigcirc$" since the ultrasortie vibrators 10 and and 11 are slanted when the floating members are moving by high waves on the river surface or by a high vertical average flow velocity. As a general case, a time period $t_{H-1}$, and another time period $t_H$, which are taken for an ultrasonic pulse transmitted from the ultrasonic vibrator 10 to be received from the ultrasonic vibrator 11 and to be received from the ultrasonic vibrator 10, respectively, are obtained as follows. That is, $$t_{H-1} = \frac{1}{\cos\alpha}\left[\frac{H'}{C+v} + \frac{H-1}{C-v}\right]$$

$$= \frac{1}{\cos\alpha}\left[\frac{2H'-l\left(1+\frac{v}{C}\right)}{C}\right]$$

wherein, $v=V\sin\alpha$.

If the vertical average flow yelpcity V is 5 m/sec in a river, which is a very fast velocity, and $\alpha=3°\sim5°$, $v=0.26\sim0.43$ m/sec. If an ultrasonic velocity in the $C \approx 1450$ m/sec, $v/C \approx 1.79\cdot10^{-4}\sim2.9\cdot10^{-4}$. Therefore, the term v/C can be ignored. Then, $$t_{H-1} = \frac{2H'-l_o}{C\cdot\cos\alpha} \tag{9}$$

The time period $t_H$, to be taken for reaching the ultrasnoic vibrator 10 is as follows. That is, $$t_H = \frac{2H'}{C \cdot \cos\alpha} \quad (10)$$

From the above formula (9) and (10), $$\frac{t_{H-1}}{t_H} = 1 - \frac{l_o}{2H'}$$

Therefore, the river depth H' is denoted as follows. That is, $$H' = \frac{t_H}{2(t_H - t_{H-1})} \cdot l_o \quad (11)$$

As a result, the river depth H is denoted as follows:

$$H = H' + \Delta H \quad (12)$$

The river depth H' can be exactly calculated from the formula (11).

An ultrasnoic velicity C is calculated as below:

$$C = \frac{2H'}{t_H} = \frac{l_o}{t_H - t_{H-1}} \quad (13)$$

As described above, the ultrasonic velocity C can be calculated by using the ultrasonic vibrator pair 10 and 11 disposed on a vertical line at a certain distance $l_o$. The ultrasortie vibrator 11 can measure a time period by receiving a pulse reflected after it transmits the ultrasonic pulse, instead of only receiving a pulse reflected after the ultrasonic vibrator 10 transmits the ultrasonic ptdse. At this time, $$t_{H-1} = \frac{2(H - l_o)}{C},$$

and from the relationship of $$\frac{t_{H-1}}{t_H}$$

$$H' = \frac{t_H}{t_H - t_{H-1}} \cdot l_o \quad (14)$$

$$C = \frac{2l_o}{t_H - t_{H-1}} \quad (15)$$

When the floating members vigorously move up and down according to waves of a river's surface, average values of H' and C must be calculated by measuring $t_H$, and $t_{h-1}$ several times. Distances L, between the ultrasortie vibrator pairs 12 and 12', 13 and 13', and 14 and 14', which are mounted on the floating members, for measuring flow velocities are set up as follows.

The maximum and minimum river levels are kanown, and the maximum and minimum river depths $H_{max}$ and $H_{min}$ at positions where vertical average flow velocities are measured are also known. For instance, when a river level varies in the range of $H_{max}/H_{min}=10$, it is presented in advance that a flow quantity must be measured.

Figure 7:
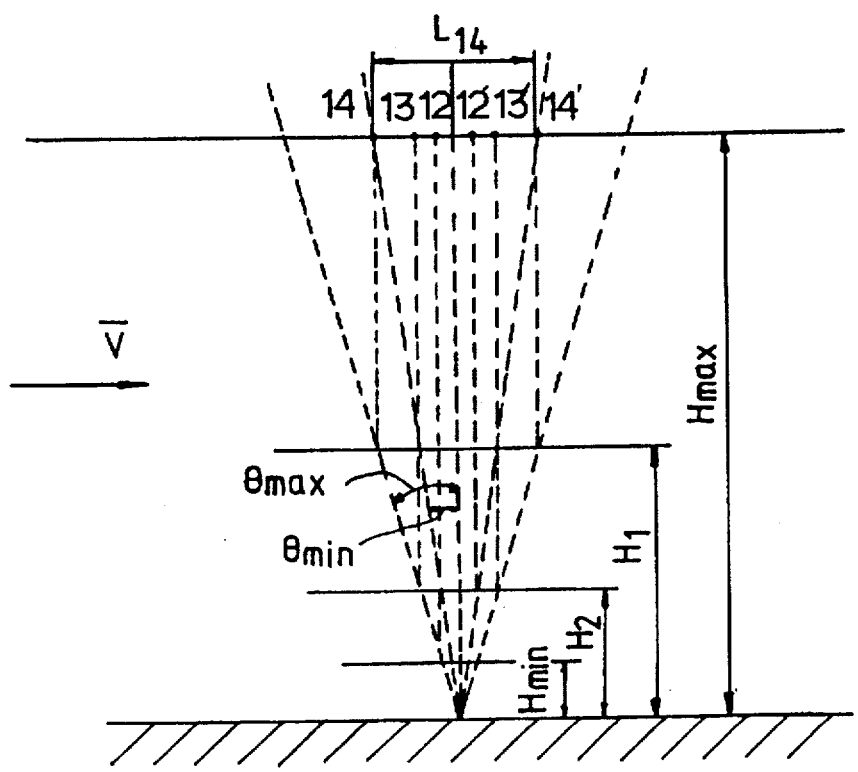
FIG. 7 is a view explaining a vertical average flow velocity measurement according to an embodiment of the present invention.

The optimal incidence angle is chosen according to a state of a reflecting surface, a substance property such as a somad resistance, and a sensitivity of a flow velocity measurement. The optimal incidence angle is not particularly set up, but in a certain range. For example, a reflecting pulse can be fully received in a range of an incidence angle θ=20°-40°. As shown in FIG. 7, if a range of an incidence angle $\theta_{max}$~$\theta_{min}$ is given and a river level $H_{max}$ is maximum, the ultrasonic vibrator pair 14 and 14' are activated. At this time, the distance between the ultrasonic vibrator pair 14 and 14' can be selected in order for an incidence angle to be a $\theta_{min}$. That is, $$L_{max} = 2H_{max} \tan\theta_{min} \quad (16)$$

($L_{max}=L_{14}$ in FIG. 7). In the same way as above, the distance $L_{min}$ of the ultrasonic vibrator pairs activated when a river's depth $H_{min}$ is minimum is determined as follows:

$$L_{min} = 2H_{min} \tan\theta_{max} \quad (17)$$

Since an ultrasonic pulse propagation distance becomes relatively short at the river level Hmin, a reflecting pulse can be fully received even though an allowable maximum angle $\theta_{max}$ is taken as an incidence angle. However, as shown in FIG. 7, a river level Hi which allows the vibrator pair 14 and 14' mounted at a distance $L_{14}$ to take a maximum incidence angle $\theta_{max}$ is as below:

$$H_i = H_{max} \cdot \frac{\tan\theta_{min}}{\tan\theta_{max}} \quad (18)$$

If $\theta_{min}=15°$, $\theta_{max}=30°$, $H_i \approx 0.46 H_{max}$. $\theta_{min}$ is selected to be secured at $H_i$ for a distance $L_{13}$ between the ultrasonic vibrator pair 13 and 13' to be activated when a river's depth is less than $H_i$. That is, $$L_{13} = 2H_i \tan\theta_{min} \quad (19)$$

When the ultrasonic vibrator pair 13 and 13' having a distance $L_{13}$ between the pair transmits an ultrasonic pulse, the river depth $H_2$ is as follows:

$$H_2 = H_1 \frac{\tan\theta_{min}}{\tan\theta_{max}} \quad (20)$$

In the above example, $H_2=0.46\ H_1$ is expected. If $a=\tan\theta_{min}/\tan\theta_{max}$, $H_1=aH_{max}$, $H_2=a^2H_{max}$, and $H_3=a^3 Hmax$.

In FIG. 7, $H_3=H_{min}$. When $\theta_{min}=15°$, $\theta_{max}=30°$, and $H_{min}=0.1\ H_{max}$, $a=0.464$ since $a^n=0.1$. Therefore, n=3.

As mentioned above, three to five ultrasonic vibrator pairs are enough for measuring a flow velocity. It is not necessary to secure angles from $\theta_{min}$ to $\theta_{max}$ within a range from 15° to 30° since a reflecting pulse is received well even at 35° when a river's depth is shallow.

Comparing to automatically controlling the distance between vibrators according to a river level by a step motor or a servo motor when a pair of ultrasonic vibrators are mounted, when a few pairs of ultrasonic vibrators are mounted at different distances therebetween and an exchanger is operated according to the river's depth (a river level) in order for necessary pairs to be connected with an ultrasonic transceiver, the error of a flow velocity measurement becomes smaller since the apparatus is simplified and the distance between the ultrasonic vibrators is exactly measured to be inputted to a flow calculation unit.

A vertical average flow velocity is measured as follows. According to the result of a river depth measurement, or under the condition that positions for measuring vertical average flow velocities are appointed, pairs of ultrasonic vibrators are selected according to the result of a river level measurement to be inputted to the ultrasonic pulse transceiver.

For an instance in FIG. 7, when a river depth is $H_{max}$, an ultrasonic pulse is transmitted from the ultrasonic vibrator 14' and time $t_{Ai}$ reached to the vibrator 14 is measured. At the same time, through a reverse way, a pulse is transmitted from the vibrator 14 and another time $t_{Bi}$ reached to the vibrator 14' is measured. The measurement data of tAi and tBi are substituted in formula (4) to calculate a vertical average flow velocity Vi titrough a calculation unit. The formula (13) or (15) are used in the formula (4) instead of the ultrasonic velocity C.

If the ultrasonic vibrator 11 also transmits and receives a pulse, the formula (15) is used and a vertical average flow velocity is calculated as follows:

$$\bar{V}_i = \frac{2(t_{Ai} - t_{Bi}) \cdot l^2}{(t_H - t_{H-1})^2 \cdot L} \quad (21)$$

When a vertical average flow velocity Vi has been measured, that is, when $t_H$, $t_{H-1}$, $t_{Ai}$, and $t_{Bi}$ have been measured, the floating members are moved to the next position of the vertical average flow velocity measurement by a flowmeter travelling unit, a vertical average flow velocity Vj is measured. When a travelling distance is denoted as $b_{ij}$, a partial quantity can be calculated as follows:

$$q_{ij} = \frac{\bar{V}_i + \bar{V}_j}{2} \cdot \frac{\bar{H}_i + \bar{H}_j}{2} \cdot b_{ij}$$

In order to lessen the margin of error of a total flow quantity $Q = \Sigma q_{ij}$, $b_{ij}$ must be taken in a low value. That is, the number of positions for measuring vertical average flow velocity measurements must be increased.

What is next is to set a reflecting condition of an ultrasonic pulse. A river bed consists of various kin& of soil. Stones on the river bed are different from each other in luminanee of its surface which is penetrated into the stones such that its sound resistance $Z_{II} = \rho_{II} C_{II}$ is not muct larger compared to fluid's resistance $z_f = \rho_f C_f$. Therefore, the reflecting coefficient of its reflecting surface is small. In case of an alluvial layer constituted with particles of earth, an absorbing coefficient of an ultrasonic pulse may be very large. In order to secure strength of the reflecting pulse, the ultrasonic frequency must be lowered. However, it is difficult to use a low frequency when considering there is a river having its one-meter depth at minimum(because of a time measurement error). Therefore, there is a limitation in lowering the ultrasonic frequency. If the strength of a reflecting pulse is weak when an optimal ultrasonic frequency is selected (for example, 500 kHz), a separate reflecting plate can be mounted in the flow quantity measurement post.

Further, according to the present invention, in order to mount a reflecting plate, the structure of a reflecting plate is provided by being conveniently mounted under instead of performing an under work.

FIGS. 8 and 8A are views showing the structure of an ultrasonic pulse reflecting unit. Further, FIG. 8 shows the state of how a reflecting unit 21 is mounted when it is placed on a river's bed. The reflecting unit 21 has a curved reflecting surface 22 under which a hollow portion is formed and filled with air. The thickness of the reflecting surface 22 is made to be a half of an ultrasonic wave length according to a selected material (at the time, an ultrasonic pulse is passed through and reflected from the air, to thereby be propagated to the), or the thickness is taken to be ¼ or ¾ of the wave length in order to reduce the penetration ratio. However, since the somnd impedance difference between and air becomes a thousand times, compared to a sound impedance of metal, it is preferable to reflect an ultrasonic pulse from an air layer. For in so doing, it is preferable for the reflecting surface 22 to be made of organic glass such as arcryl. The reflecting unit 21 includes the reflecting surface 22 and is coated with a specialized paint including fluorine (F) to prevent underwater creatures from growing on the surface while being submerged. Otherwise, the reflecting surface 22 is made of plastic including fluorine. The reflecting unit 21 is formed in a river line shape at its front and rear portions, as shown in FIG. 8, when viewed in a flow direction, so as to minimize resistance to the flow.

Further, the reflecting unit 21 has a hollow portion filled with air so that the reflecting unit 21,just like a floating member, has a floating force to move upwards. The reflecting unit 21 is connected with a plumb 23 of heavy metal and a ball joint 24. It is allowable to connect the reflecting unit 21 and a plumb 23 with a Hooke's joint. The bottom of the plumb 23 has a plurality of fixed members 26 to facilitate the fixture of the plumb 23 on the bed of a river.

As shown in FIG. 8, even though the plumb 23 is not placed in parallel with the river's bed since the river's bed is not even, the reflecting surface(22) is positioned in parallel with the river bed since the reflecting unit 21 floats by a floating force. Although the flow velocity of a river bed is very small, the reflecting unit 21 may fluctuate under the influence of the flow. Therefore, the ball joint 24 has to be somewhat stiff(tight) therein preventing the reflecting unit 21 from freely moving.

The reflecting unit 21 has plumbs 28 attached on the front and rear portions thereof to be balanced in parallel as well as to prevent its free movement. The plumb 23 may have a wide area in order to have a sufficient weight while reducing its height. However, the reflecting unit 21 can be severely slaned to one side due to the unevenness of a river bed when the area is large, so auxiliary pkmabs 25 are connected with the front and rear portions of the plumb 23 by other ball joints 27. The bottoms of the auxiliary plumbs 25 have a plurality of fixed members 26. The weight of the plumbs 28 is adjusted through an experimentation in a reservoir together with the reflecting unit 21. The reflecting surface 22 is large enough, and is about one ne. ter long since the floating members 7' and 7" may move a bit along with a river surface flow. The width is taken to be ½ or ¾ of the length. The reflecting surface 22 and the auxiliary plumbs 25 have rings 29. By tying a rope to the rings 29, the reflecting unit 21 is dropped to an appointed position by using a boat or a flowmeter travelling unit.

Figure 9:
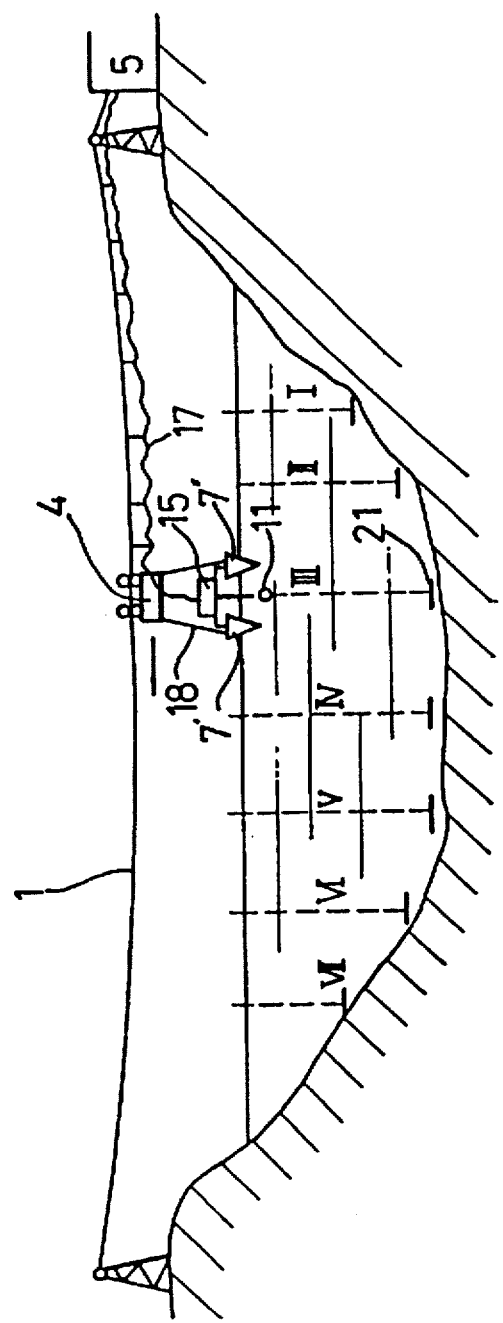
FIG. 9 is a view showing the apparatus of FIG. 5 placed in a river.

The rope tied to the reflecting unit 21 is adjusted until the reflecting surface 22 is parallel with the river bed (Further explanation about this is skipped because of its irrelevance with the embodiment of the present invention). The reflecting unit 22 may not be used when a pulse signal of a selected ultrasonic frequency is reflected well since the sound impedance of river bed soil has a big difference from the sound impedance at the flow quantity measurement post. FIG. 9 is a view showing the apparatus of FIG. 5 mounted in a river. The floating members 7 and 7" are connected through a rope 18 with a travelling unit 4 which travels along a steel line 1. A high frequency cable line 17 moves along the line 1. The high frequency cable line 17 is connected between the first measurement unit and the second measurement mait mounted in the flow quantity measurement post 5(a drum for the cable line(not shown) is mounted in the measurement post 5). The reflecting unit 21 is disposed at an appointed position where the vertical average flow velocity and river depth are measured.

Advantages are as follows when a river flow quantity is measured by the apparatus for ultrasonically measuring the vertical average flow velocity and a river's depth, according to an embodiment of the present invention having the structure mentioned above, instead of the propeller flowmeter (or the cup-type flowmeter) which is currently used.

Firstly, the time period for measuring vertical average flow velocity is ten times reduced compared to the time period when the propeller flowmeter is used. The propeller flowmeter measures a river flow velocity at one position, but the variation rate of the river flow velocity is between 10% to 15%. Therefore, a long time period (60 to 300 seconds) is required to measure the number of rotations of a propeller in order to measure the average river flow velocity. However, the variation rate of an average flow velocity is less than 1% when the average flow velocity is ultrasonically measured from a river's surface to its bed in a short time period. Therefore, repeated measurements for a long time period are unnecessary.

Since the propeller flowmeter requires measurements of river flow velocities at various river depths on a vertical line in order to calculate the vertical average flow velocity, a lengthy time period is needed for measuring the vertical average flow velocity at a single position.

It takes 0.1 second to ultrasonically measure the vertical average flow velocity one, e, including the time period for an ultrasonic velocity measurement is considered, even though the river's depth is 10 m. Therefore, about 10 seconds are needed for three measurements in a certain period (when a measurement is repeatedly done in 3 seconds). Accordingly, when vertical average flow velocities and river depths are measured on appointed vertical lines, a time period for moving the floating members takes a major portion of an entire time period for the measurements.

Secondly, the vertical average flow velocity measurement margin of error is remarkably reduced, thereby lessening the flow quantity measurement error. The reason is as follows:

In order to exactly measure a vertical average flow velocity by using a propeller flowmeter, there are a number of positions for river flow velocity measurements, especially when vertical average flow velocities are not in a distribution having a certain rule(for example, in the logarithm or the exponential function). In this case, a measurement is almost impossible since too much a time is required. Since variations of flow velocity distribution and direction become more complicated according to the shape of a river bed when approached nearer to the river bed, the diameter of a propeller flowmeter and the size of a plumb connected to the flowmeter are restrained within the limited value respectively. Therefore, the flowmeter is limitedly approached, having a certain distance from the river bottom. Further, since the axle of the flowmeter is not maintained at the fight angle to a vertical line when the flowmeter is inserted deeper, the margin of measurement error of a flow velocity at the right angle to the vertical line becomes greater.

Since the river flow velocity is a dynamic variable which varies in a variety of frequencies while the flowmeter has only a static measurement characteristic(in a relation between the rotating velocity of the flowmeter and a velocity pulling upward or downward), another error results from the difference between the dynamic and the static characteristics. This kind of error does not occur when the vertical average flow velocity is ultrasonically measured. Further, the measurement error is reduced since the variation of a vertical average flow velocity is less than that of a river flow velocity.

Thirdly, vertical lines for measuring the vertical average flow velocity are remarkably increased since the time period for ultrasonically measuring the vertical average flow velocity becomes shorter. This is because the apparatus according to an embodiment of the present invention requires only a shoa time for moving floating members along a river's surface, whereas the propeller flowmeter requires a longer time period for being moved to various river depths in addition to moving to the next vertical line.

Accordingly, the time period required becomes shorter even though the number of vertical lines is increased four times. The increase of the number of vertical lines magnificently reduces the flow quantity measurement error. The above advantages are greatly instrumental when the flow quantity is rapidly increased during the rainy season. The structure of FIG. 5 is suitable when a flowmeter is directly connected to a travelling unit for automatically moving the flowmeter.

Since most of the floating members 7' and 7" connected to the winch 4 through four ropes 18, do not fluctuat by waves, no problems occur when the river depth is measured by the ultrasonic vibrators 10 and 11.

The apparatus according to an embodiment of the present invention is not only used in the permanent flow quantity measurement post having the automatic travelling unit for the flowmeter, but also used when drawing or correcting a river level- flow quantity curve or when measuring the flow quantity at a position in the flow quantity measurement post for measuring the flow quantity in use of a river level- flow quantity curve.

In the case when there is a hygrometric bridge for a flow quantity measurement post, the flow quantity can be measured through measuring the vertical average flow velocity and the river's depth while moving the floating members shown in FIG. 5 instead of a propeller flowmeter in the same way as in the case that the flow velocity is measured while moving the propeller flowmeter along a hygrometric bridge. A pedestrian overpass can be used for measuring the flow quantity.

In the case when there is no hygrometric bridge or overpass, while drawing floating members by using a ship, such as a boat, a motor boat, etc., or while travelling floating members across a river by temporarily setting up a rope when a river width is narrow, the vertical average flow velocity and river depth are measured. In this case, the reflecting unit is simultaneously moved. Since floating members are liable to move up and down by waves when the floating members are manually travelled, river depth and ultrasonic velocity measurement errors may become larger. In such case, according to the embodiment of the present invention, in order to place the ultrasonic vibrators 10 and 11 on a vertical line all the time, a supporting bar is integrally formed on an upper portion of floating members, a supporter for the ultrasonic vibrators 10 and 11 is connected to a ball joint or the floating members, and the supporting bar is connected to a plumb 34 as shown in FIG. 10.

Figures 10, 10A:
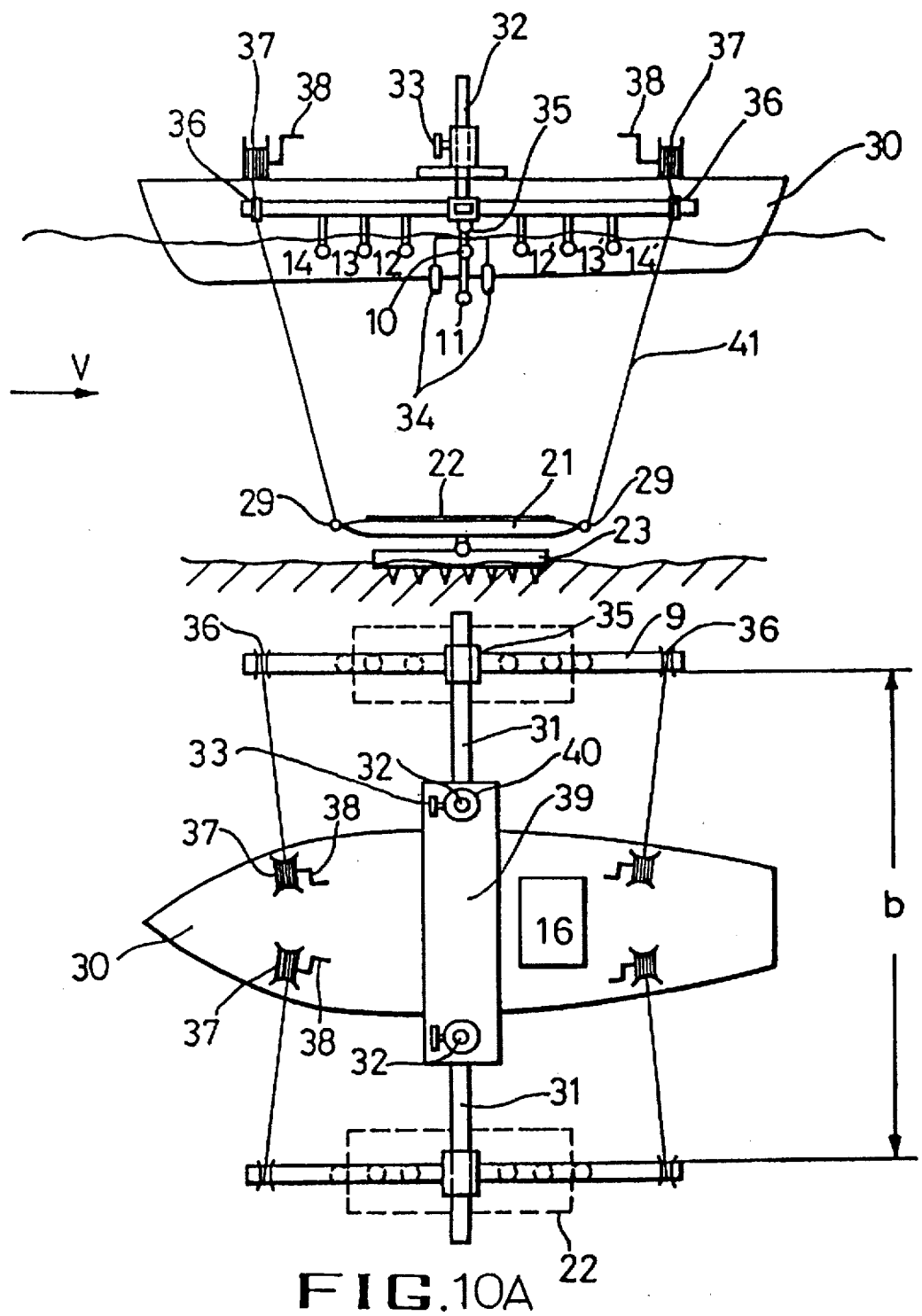
FIGS. 10 and 10A are respectively a side view and a top view showing the apparatus of FIG. 5 installed in a boat.

In the meantime, as shown in FIG. 10, the vertical average flow velocity and river depth are measured by using a boat, according to the embodiment of the present invention. In this case, the boat plays a role of floating members, and a supporter 9 for ultrasonic vibrators is mounted which has ultrasonic vibrators symmetrically mounted at the left and right sides of the boat. The boat is placed at an appointed position, and the partial flow quantity is measured. The boat travels across the river in order for another partial flow quantity to be measured. A partial flow measurement unit for such measurement, according to the embodiment of the present invention, fixes a mount plate 39 for mounting an ultrasonic vibrator supporter 9 at the center of gravity of the boat 30, as shown in FIG. 10. A supporting bar 31 is in the shape of "L" and has a rectangular cross section, which is used not only to control but also to maintain the ultrasonic vibrator supporter at a certain distance on the left and right sides of the boat. The vertical portion 32 of the supporter 9 is in a circular shape and inserted into a cylinder 40 so as to be fixed. The cylinder 40 moves up and down the vertical portion 32 in order for ultrasonic vibrators to be in contact with the river surface, selects a position for the ultrasonic vibrator supporter 9, controls to be in their mutual parallelism while fixing the vertical portion 32 by a fixing pin 33.

The boat slightly moves forwards and backwards even though a sail is used on it. Accordingly, an error may become larger when a river's depth is measured by using the ultrasortie vibrators 10 and 11. In order to avoid such error, the ultrasonic vibrators 10 and 11 are connected with the supporter 9 and the ball join 35, and the plumbs 34 symmetrically disposed are connected with a connecting bar of the ultrasonic vibrators 10 and 11. Therefore, the ultrasonic vibrators 10 and 11 are placed on a vertical line all the time even when the boat is fluctuated, which makes a difference from the one shown in FIG. 5.

The reflecting unit 21 and the plumbs 23 are displaced at the same time that the boat changes its position. A rope 41 is connected to the rings 29 fixed on the reflecting unit 21, the rope 41 is connected to a drum, which winds and releases the rope 41, via a travelling unit 36 disposed at both ends of the ultrasonic vibrator supporter 9. Therefore, when moving the reflecting unit 21 and the plmnbs 23, the rope is wound around the drum 37 in order for them to be lifted slightly from the river bed, so that the boat moves to another position where the vertical average flow velocity is measured.

The boat is stopped at an appointed position to throw anchors(not shown) placed on the front and rear portions of the ship into a river, and then the reflecting unit 21 and the plumbs 23 rest on the river bed by releasing the rope from the drum 37. At this time, the rope 41 is tightened not to be loose. By using the rope, a position of the reflecting surface 22 can be so adjusted that the reflecting surface 22 is placed in parallel in order for an ultrasonic pulse to be well reflected. The first measurement unit is built in the case 16 on the ship. The first measurement trait has an ultrasonic transceiver, a time interval measurer, and a memory. A final calculation of the flow quantity can be performed on the land. Front and rear sails on the ship itself prevent the ship from moving according to directions of the surface flow velocity, and reflecting units thrown on the left and right sides of the ship restrained the left and right movements of the ship to an extent. A distance b between positions for measuring the vertical average flow velocity and river depth is selected by moving the position of the ultrasonic vibrator supporter 9 along the supporting bar 39. Processes for measuring the river's depth, ultrasonic velocity and average flow velocity are not changed.

Comparing processes according to the present invention with conventional processes for measuring a river flow velocity by placing a propeller flowmeter at various depths on board, the time period taken until the boat is settled from its movement is reduced to a half, the time period needed for measuring a river depth and a vertical average flow velocity is a hundred times reduced, and the error of measurement is magnificently reduced. Especially, a measurement for a partial flow quantity $q_i$ is completed at one place where the boat is positioned.

What is claimed is:

1. An apparatus for measuring the flow quantity in a river by measuring the vertical average flow velocity and river depth, wherein a deck connects two floats to each other to form a floating member, an ultrasonic vibrator mounted along a center line of the floating member, a plurality of ultrasonic vibrator pairs having a common center point, said pairs being disposed on the left and right sides of a common center point, a reflecting unit mounted on a river bed directly below the common center point for reflecting back from the reflecting unit ultrasonic pulses, two further ultrasonic vibrators vertically disposed apart at a distance $l_o$ below the common center point, the deck being provided with a first measuring unit having an ultrasonic pulse transceiver, an ultrasonic pulse propagation time measurement unit, an exchanger connected to the ultrasonic pulse transceiver to select one of said ultrasonic vibrators, a control unit on land near the river provided with a second measuring unit for calculating (a) the river's depth, (b) an ultrasonic pulse velocity, (c) a vertical average flow velocity, (d) a partial flow quantity and (e) an entire flow quantity, a cable line coupling the first and second measuring units to transmit and receive ultrasonic pulse propagation time measurement results, and wherein the floating member comprises a catamaran provided with travelling means to move across the width of a river.

2. The apparatus as claimed in claim 1, wherein a supporting bar is connected to mount the ultrasonic vibrators, a universal joint and a plumb disposing the ultrasonic vibrators vertically, at the distance $l_o$ to measure the depth of the river and the ultrasonic velocity.

3. The apparatus as claimed in claim 1, further comprising an ultrasonic pulse reflecting unit locatable on the river bottom, wherein, a mount plate mounting the ultrasonic vibrators on left and right sides of the floating member exclusive of the two floats, and an L-shaped supporting bar for controlling a distance and a parallelism between the ultrasonic vibrators on the left and right sides, a vertical portion of the L-shaped supporting bar beinq of round shape and fixed in a cylinder on the mount plate, a horizontal portion of the L-shaped supporting bar being of rectangular shape inserted in a rectangular receptacle at a center of the ultrasonic vibrators, a travelling unit mounting means on both ends of the ultrasonic vibrators on the floating member for moving up and down the ultrasonic reflecting unit, and means to move the reflecting unit responsive to the travelling means.

4. The apparatus as claimed in claim 3, wherein the ultrasonic reflecting unit has a rectangular shape with a hollow portion filled with air comprising floating means connected to a basic plubm through a universal joint to stably ist on a river bottom, and a plurality of auxiliary plumbs connected with the basic plumb through the universal joint to provide a ballast weight separated from the plumb.

5. The apparatus as claimed in claim 3, wherein the reflecting unit has a surface containing fluorine to prevent underwater creatures from growing on the surface thereof while under water.

6. A method for measuring a river flow quantity by simultaneously measuring a river depth and a vertical average flow velocity, comprising the steps of:

setting a distance $L_i$ between left and right sides with respect to a center point of a river surface along a river width which is normal to a cross section of a river flow, setting a plurality of ultrasonic vibrator pairs $A_i$ and $B_i$ in accordance with expected maximum and minimum river depths , and mounting two vertically spaced ultrasonic vibrators a distance $l_o$ apart for producing ultrasonic pulses from a coupled ultrasonic vibrator located at the center point;

mounting a reflecting surface in parallel with a river bottom;

mounting a group of ultrasonic vibrators at appointed positions i across the river width, measuring a time period taken for ultrasonic pulses transmitted from one ultrasonic vibrator to another when reflected from the reflecting surface, and calculating an ultrasonic velocity C therefrom at a river depth $H_i$;

mounting the ultrasonic vibrator pairs $A_i$ and $B_i$ at a distance $L_i$ therebetween for transmitting and receiving ultrasonic pulses within a range of an optimal ultrasonic incidence angle at the river depth $H_i$;

measuring an average river flow velocity $V_i$ on a vertical line by measuring time $t_{BAi}$ when ultrasonic pulses transmitted from the ultrasonic vibrator reaches the ultrasonic vibrator $A_i$ after being reflected from the reflecting surface and time $t_{ABi}$ when ultrasonic pulses transmitted from the ultrasonic vibrator $A_i$ reaches the ultrasonic vibrator $B_i$;

moving the ultrasonic vibrators from a position i to a position j along the river width, and measuring a river depth H. and a vertical average flow velocity $V_j$ by repeating the above measurement steps; and measuring a partial flow quantity by measurement results of the vertical average flow velocities $V_i$ and $V_j$, the river depths $H_i$ and $H_j$, and a distance $b_{ij}$ between the positions i and j.

7. The method as claimed in claim 6, wherein the step for mounting the ultrasonic vibrator pairs $A_i$ and $B_i$ at a distance $L_i$ therebetween comprises the steps of:

calculating distances $L_{max}$ and $L_{min}$ between the ultrasonic vibrators corresponding to a maximum river depth $H_{max}$ and a minimum river depth $H_{min}$ having an allowable maximum indicence angle $\theta_{min}$ from following formulae:

calculating a river depth range $H_{max} \sim H_1$ enabling the ultrasonic vibrator pairs disposed at the distance $L_{max}$ to be operated from following formula:

$$H_1 = \frac{\tan\theta_{min}}{\tan\theta_{max}} \cdot H_{max} = aH_{max};$$

calculating a distance $L_1$ between the ultrasonic vibrator pair to be operated in river depths $H_1 \sim H_2$ from following formula:

$$L_1 = 2H_1 \tan\theta_{min};$$

calculating a river depth $H_2$ from following formula:

$$H_2 = a^2 H_{max};$$

calculating a distance $L_2$ between the ultrasonic vibrator pair to be operated in river depths $H_2 \sim H_3$ from following formula:

$$L_2 = 2H_2 \tan\theta_{min}; \text{ and}$$

calculating a river depth $H_3$ from following formula:

$$H_3 = a^3 H_{max}.$$

8. The method as claimed in claim 6, further comprisinq calculating the ultrasonic velocity C at the river depth $H_i$ by the steps of:

measuring a time period $t_H$, taken for ultrasonic pulses transmitted from an ultrasonic vibrator on a river surface to reach the ultrasonic vibrator after being reflected from a river bottom from the formula:

$$t_H = \frac{2H'}{C};$$

measuring a time period $t_{H-lo}$ taken for ultrasonic pulses transmitted from a second ultrasonic vibrator E vertically disposed at a distance $l_o$ from the first said ultrasonic vibrator no reach the ultrasonic vibrator E after being reflected from a river bottom from the following formula:

$$t_{H-l_o} = \frac{2(H'-l_o)}{C};$$

calculating a river depth H' from following formula:

$$H' = \frac{t_H}{t_H - t_{H-l_o}} \cdot l_o;$$

and calculating from the following formula an ultrasonic velocity C when H' is measured from the formula of $H=H'++\Delta H+d$, wherein $H=a$ river depth, $\Delta H=a$ river depth for an ultrasonic vibrator below a river surface, and $d=a$ thickness of a reflecting unit having a reflecting plate positioned on a river bottom:

$$C = \frac{2H'}{t_H} = \frac{l_o}{t_H - t_{H-l_o}}$$

wherein a relationship of an expectable minimum river depth $H_{min}$ and a distance $l_o$ between ultrasonic vibrators is as follows:

$$l_o \leq \frac{H_{min}}{2}.$$

9. The method as claimed in claim 6, wherein the vertical average flow velocity $V_i$ is obtained from the following formula by operating the ultrasonic vibrator pair $A_i$ and $B_i$ disposed at a distance $L_i$ normal with respect to a cross section of a river flow:

$$\overline{V}_i = \frac{2(t_{Ai} - t_{Bi})}{L} \cdot \left( \frac{l_o}{t_H - t_{H-l_o}} \right)^2$$

in which $t_{Bi}=a$ time period taken for ultrasonic pulses transmitted from the ultrasonic vibrator $B_i$ to reach the ultrasonic vibrator $A_i$ after being reflected from a river bottom, and $t_{Ai}=a$ fmae period taken for ultrasonic pulses transmitted from the ultrasonic vibrator $A_i$ to reach the ultrasonic vibrator $B_i$ after being reflected from a river bottom.

10. The method as claimed in claim 6, wherein a flow quantity Q of a river is obtained from $\Sigma q_{ij}$ of a river is expressed as follows:

$$q_{ij} = \frac{\overline{V}_i + \overline{V}_j}{2} \cdot \frac{H_i + H_j}{2} \cdot b_{ij}$$

wherein, $H_i=a$ river depth at position i, $V_i=a$ vertical average flow at position i, $H_j=a$ river depth at position j, and $V_j=a$ vertical average flow at position j, the position j being the position where the group of ultrasonic vibrators moves by a "b" distance along a stream.

* * * * *